(12) United States Patent
    Simpson

(10) Patent No.: US 11,434,389 B2
(45) Date of Patent: Sep. 6, 2022

(54) OPTICALLY TRANSPARENT SUPERHYDROPHOBIC THIN FILM

(71) Applicant: Waymo LLC, Mountain View, CA (US)

(72) Inventor: John T. Simpson, Sahuarita, AZ (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/106,740

(22) Filed: Nov. 30, 2020

(65) Prior Publication Data

US 2021/0079251 A1 Mar. 18, 2021

Related U.S. Application Data

(63) Continuation of application No. 15/991,873, filed on May 29, 2018, now Pat. No. 10,870,775.

(Continued)

(51) Int. Cl.
   C09D 127/12 (2006.01)
   C09D 7/20 (2018.01)
   (Continued)

(52) U.S. Cl.
   CPC ........... C09D 127/12 (2013.01); B05D 1/005 (2013.01); B05D 3/142 (2013.01); B05D 5/083 (2013.01); B05D 7/24 (2013.01); B05D 7/50 (2013.01); C03C 17/007 (2013.01); C03C 17/3405 (2013.01); C08L 27/12 (2013.01); C09D 7/20 (2018.01); C09D 7/62 (2018.01); *B05D 2203/35* (2013.01); *B05D 2350/30* (2013.01); *B05D 2350/60* (2013.01); *B05D 2401/10* (2013.01);
   (Continued)

(58) Field of Classification Search
   CPC .......... C09D 127/12; C09D 7/20; C09D 7/62; C03C 17/007; C03C 17/3405; B05D 3/142; B05D 5/083; B05D 7/24; B05D 7/50; B05D 1/005; C08L 27/12
   USPC ........................................................ 524/544
   See application file for complete search history.

(56) References Cited

U.S. PATENT DOCUMENTS 7,348,389 B2  3/2008  Graham et al.
8,580,027 B1  11/2013  Campos et al.
   (Continued)

FOREIGN PATENT DOCUMENTS

CN  105499092 A  4/2016
CN  107254237 A  10/2017
   (Continued)

OTHER PUBLICATIONS

Simpson et al., "Superhydrophobic materials and coating: a review", Re. Prog. Phys. 78 (2015) 086501 (Year: 2015).
(Continued)

*Primary Examiner* — Michael M. Bernshteyn
(74) *Attorney, Agent, or Firm* — McDonnell Boehnen Hulbert & Berghoff LLP

(57) ABSTRACT

A composition that is easily applied, clear, well-bonded, and superhydrophobic is disclosed. In one aspect, the composition includes a hydrophobic fluorinated solvent, a binder comprising a hydrophobic fluorinated polymer, and hydrophobic fumed silica nanoparticles. Also disclosed is a structure including a substrate coated with the composition, as well as a method for making the composition and a method of coating a substrate with the composition.

20 Claims, 1 Drawing Sheet

Related U.S. Application Data

(60) Provisional application No. 62/635,993, filed on Feb. 27, 2018.

(51) Int. Cl.

| | | |
|---|---|---|
| *C09D 7/62* | (2018.01) | |
| *C03C 17/00* | (2006.01) | |
| *C03C 17/34* | (2006.01) | |
| *B05D 1/00* | (2006.01) | |
| *B05D 3/14* | (2006.01) | |
| *B05D 5/08* | (2006.01) | |
| *B05D 7/24* | (2006.01) | |
| *C08L 27/12* | (2006.01) | |
| *C08K 3/36* | (2006.01) | |
| *C08K 9/04* | (2006.01) | |
| *C08K 9/08* | (2006.01) | |
| *C08K 7/22* | (2006.01) | |
| *B05D 7/00* | (2006.01) | |

(52) U.S. Cl.
CPC ...... *B05D 2506/10* (2013.01); *B05D 2601/22* (2013.01); *C03C 2217/445* (2013.01); *C03C 2217/478* (2013.01); *C03C 2217/76* (2013.01); *C08K 3/36* (2013.01); *C08K 7/22* (2013.01); *C08K 9/04* (2013.01); *C08K 9/08* (2013.01); *C08K 2201/005* (2013.01); *C08L 2312/08* (2013.01)

(56) References Cited

U.S. PATENT DOCUMENTS

| | | |
|---|---|---|
| 8,679,578 B2 | 3/2014 | Akutagawa et al. |
| 8,741,158 B2 | 6/2014 | Aytug et al. |
| 8,741,432 B1 | 6/2014 | Campos et al. |
| 9,221,076 B2 | 12/2015 | Simpson et al. |
| 9,752,049 B2 | 9/2017 | Armstrong et al. |
| 9,771,656 B2 | 9/2017 | Aytug et al. |
| 9,777,161 B1 | 10/2017 | Campos et al. |
| 10,870,775 B2 | 12/2020 | Simpson |
| 2011/0256375 A1 | 10/2011 | Yoshida et al. |
| 2013/0157008 A1 | 6/2013 | Aytug et al. |
| 2013/0236695 A1 | 9/2013 | Aytug et al. |
| 2014/0120340 A1 | 5/2014 | Riddle et al. |
| 2014/0130710 A1* | 5/2014 | Laukkanen .......... C09D 101/02 427/458 |
| 2014/0287243 A1* | 9/2014 | Weber .................. C09D 7/67 524/263 |
| 2017/0036241 A1* | 2/2017 | Constantinou .......... C09D 7/69 |
| 2017/0204279 A1 | 7/2017 | Larimer et al. |
| 2017/0283316 A1 | 10/2017 | Meuler et al. |
| 2017/0362257 A1 | 12/2017 | Venema |

FOREIGN PATENT DOCUMENTS

| | | |
|---|---|---|
| CN | 107267030 A | 10/2017 |
| CN | 107384055 A | 11/2017 |
| JP | 2013-180221 A | 9/2013 |
| WO | 2010/033288 A2 | 3/2010 |
| WO | 2014035742 A2 | 3/2014 |

OTHER PUBLICATIONS

Simpson, John, et al., Superhydrophobic materials and coatings: a review IPO Publishing, Rep. Prog. Phys. 2015, 78, 086501, 14 pages (Jul. 16, 2015).

International Search Report and Written Opinion, dated Jun. 14, 2019, in International Application No. PCT/US2019/019734.

* cited by examiner

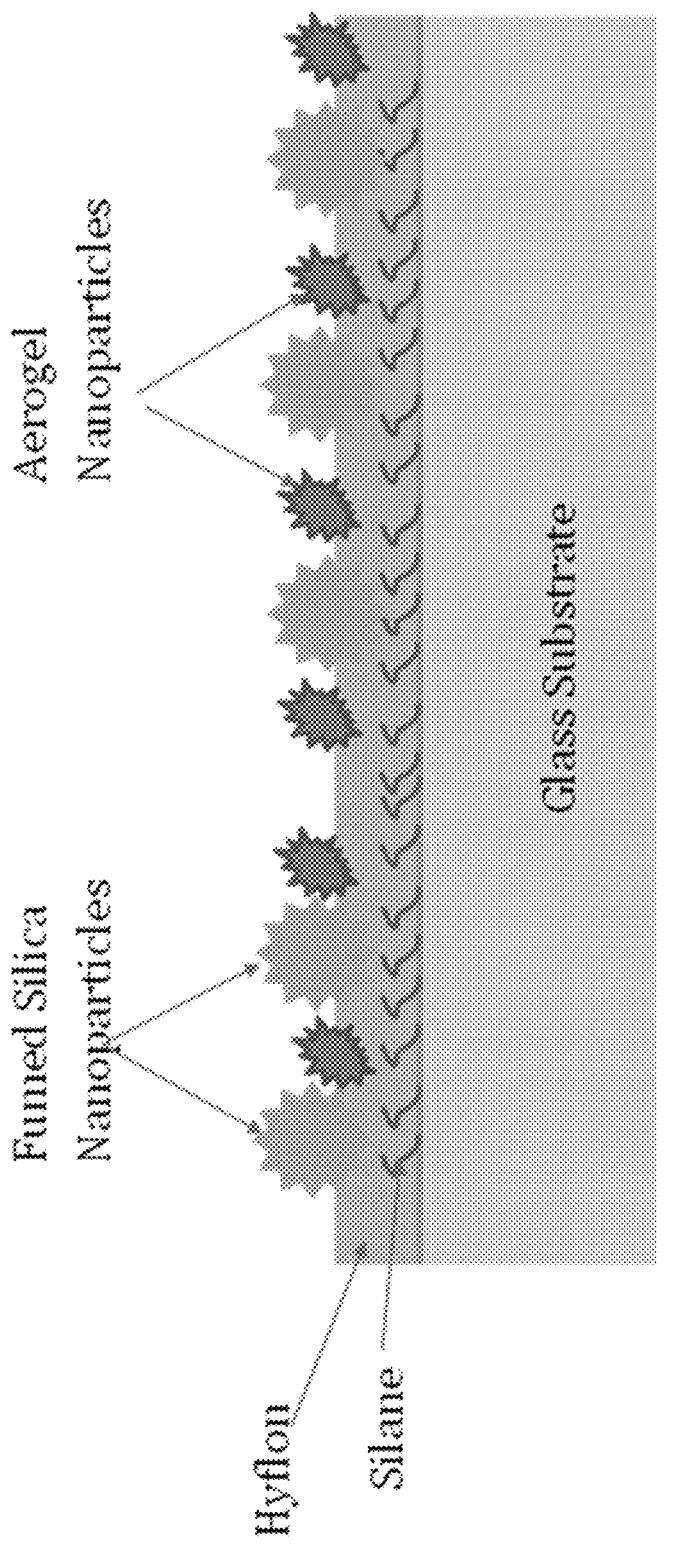

OPTICALLY TRANSPARENT SUPERHYDROPHOBIC THIN FILM

CROSS-REFERENCE TO RELATED APPLICATIONS

This application is a continuation of U.S. patent application Ser. No. 15/991,873, filed May 29, 2018, which claims priority to U.S. Provisional Application No. 62/635,993 filed on Feb. 27, 2018. The foregoing applications are incorporated herein by reference.

BACKGROUND

Unless otherwise indicated herein, the materials described in this section are not prior art to the claims in this application and are not admitted to be prior art by inclusion in this section.

Superhydrophobic surfaces and coatings having exceptional water repellency properties have potential application in numerous fields of endeavor. Well-bonded, optically clear coatings have been achieved, as have optically clear, superhydrophobic coatings. But there remains a need for an easily applied, optically clear, well-bonded, superhydrophobic coating or thin film. This is because the physical properties that can achieve these three characteristics tend to be mutually exclusive when using conventional thin film materials and methods. For example, a superhydrophobic material typically has a micro- to nanometer surface roughness, which tends to scatter light and makes optical clarity difficult to achieve. Likewise, materials with high optical clarity tend to have low surface roughness (i.e., a very smooth surface) and do not usually allow good bonding to low surface energy hydrophobic materials.

SUMMARY

In one aspect, the present disclosure provides a composition including a hydrophobic fluorinated solvent, a binder comprising a hydrophobic fluorinated polymer, hydrophobic fumed silica nanoparticles, and optionally, hydrophobic aerogel nanoparticles. In some embodiments, the binder is present in about 0.3 to about 1.5 weight percent of the composition. In other embodiments, the hydrophobic fumed silica nanoparticles are present in about 0.01 to about 0.5 weight percent of the composition.

In another aspect, the present disclosure provides a structure including a substrate and a superhydrophobic coating on at least a portion of the substrate. The superhydrophobic coating may include a hydrophobic fluorinated solvent, a binder comprising a hydrophobic fluorinated polymer, hydrophobic fumed silica nanoparticles, and optionally, hydrophobic aerogel nanoparticles. The substrate may be an optically transparent substrate such as glass or plastic.

In another aspect, the present disclosure provides a method for making a composition. The method includes combining a hydrophobic fluorinated solvent, a binder comprising a hydrophobic fluorinated polymer, fumed silica nanoparticles, and optionally, hydrophobic aerogel nanoparticles, mixing the combination, and drying the mixture to provide the composition.

In another aspect, the present disclosure provides a method for coating a substrate with a composition. The method includes depositing a silane on at least a portion of a substrate, and depositing a composition on at least a portion of a surface of the deposited silane. The composition may include a hydrophobic fluorinated solvent, a binder comprising a hydrophobic fluorinated polymer, hydrophobic fumed silica nanoparticles, and optionally, hydrophobic aerogel nanoparticles.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1 illustrates a view of an example superhydrophobic optical thin film, including the various thin film layers and associated hydrophobic nanoparticles, according to aspects of the present disclosure.

DETAILED DESCRIPTION

The following detailed description describes various features and functions of the disclosed methods, compositions, and structures. The illustrative embodiments described herein are not meant to be limiting. It will be readily understood that certain aspects of the disclosed methods, compositions, and structures can be arranged and combined in a wide variety of different configurations, all of which are contemplated herein.

A superhydrophobic composition that is easily applied and well-bonded without sacrificing hydrophobicity or optical transparency is described. "Superhydrophobic," as used herein, describes surfaces or coatings that have a water contact angle of at least about 130°. Also as used herein, an "optically transparent" coating transmits at least about 90% of incident light having a wavelength in the range of 300 nm to 1500 nm. "Well-bonded," as used herein, refers to a composition, that when applied as a coating or thin film to a substrate, adheres to the substrate so as to not be easily removed with small amounts of shear force (e.g., rubbing) or by exposure to environmental conditions (e.g., sun, rain, wind, etc.).

In one aspect, the present disclosure provides a composition including
a hydrophobic fluorinated solvent;
a binder comprising a hydrophobic fluorinated polymer;
hydrophobic fumed silica nanoparticles, and
optionally, hydrophobic aerogel nanoparticles.

The hydrophobic fluorinated solvent may be a fluorinated material capable of dissolving the binder described herein. To provide good optical clarity of the resulting film or coating, it is beneficial that the composition include particles that are well-dispersed throughout the deposition process. Particles that are too large or poorly dispersed can lead to clouding of the superhydrophobic surface. Desirable dispersion may be achieved by using a suitable hydrophobic fluorinated solvent, which may act as a dispersive agent. In some embodiments, the hydrophobic fluorinated solvent may include a fluorinated alkane, fluorinated trialkylamine, fluorinated cycloalkane, fluorinated heterocycloalkane, or combination thereof. In some embodiments, the fluorinated component may be perfluorinated. Suitable fluorinated solvents are commercially available from a number of sources, such as 3M (Maplewood, Minn.). Suitable fluorinated solvents include, for example, Fluorinert™ FC-40, Fluorinert™ FC-43, Fluorinert™ FC-75, Fluorinert™ FC-770, or an equivalent or similar material.

The fluorinated polymer binder may include a hydrophobic, fluorinated polymer that is capable of being dissolved in the hydrophobic fluorinated solvent described herein. The binder may enable the hydrophobic particles to adhere to the surface of a substrate, but if the binder is not selected properly or is used in the wrong amount, the binder may affect the optical clarity of the resulting film or coating. The fluorinated polymer binder is preferably optically clear and amorphous. In some embodiments, the fluorinated polymer binder may be a fluroalkyl polymer, fluoroalkoxy polymer, perfluoroalkyl polymer, perfluoroalkoxy polymer, or combination thereof. Suitable fluorinated polymer binders are commercially available from a number of sources, such as Solvay (Brussels, Belgium). Suitable fluorinated polymer binders may include, for example, Teflon® AF and Hyflon® AD.

The amount of the binder in the composition is related to the ability of the composition to form a film or coating with the desired superhydrophobic, optical transparency and well-bonded properties described herein. If too much binder is used in the composition, the nanoparticles may be engulfed by the binder to such a degree that the surface loses its nanotexturing and thus its superhydrophobic properties. If too little binder is employed, the nanoparticles may not be effectively bonded to the substrate, and the adherence to the substrate may be affected. In some embodiments, the fluorinated polymer binder is present in about 0.3 to about 1.5 weight percent of the composition. In other embodiments, the binder is present in about 0.8 to about 1.2 weight percent of the composition. The binder may also be present in about 0.3 to about 1.4 weight percent, about 0.4 to about 1.5 weight percent, about 0.3 to about 1.3 weight percent, about 0.4 to about 1.3 weight percent, about 0.4 to about 1.2 weight percent, about 0.5 to about 1.2 weight percent, about 0.5 to about 1.1 weight percent, about 0.5 to about 1.0 weight percent, about 0.6 to about 1.0 weight percent, about 0.7 to about 1.4 weight percent, about 0.5 to about 1.5 weight percent, about 0.5 to about 1.2 weight percent, or about 0.3 to about 0.9 weight percent of the composition.

The hydrophobic fumed silica nanoparticles may be silica nanoparticles chemically modified with a hydrophobic silane. Suitable hydrophobic fumed silica nanoparticles are generally high surface area, nanostructured and/or nanoporous particles with an average particle size of about 200 nm or less. The average fumed silica nanoparticle size represents an average linear dimension of the particles (e.g., an average diameter in the case of substantially spherical particles), and it may represent an average grain or crystallite size, or, in the case of agglomerated particles, an average agglomerate size. In some embodiments, the average fumed silica nanoparticle size may be less than about 100 nm, less than about 75 nm, or less than about 50 nm. However, extremely small fumed silica nanoparticles (e.g., a few nanometers or less) may be difficult to disperse. In some embodiments, the average fumed silica nanoparticle size is from about 10 nm to about 200 nm, from about 25 nm to about 100 nm or from about 40 nm to about 60 nm. In some embodiments, the nanoparticles are chemically treated with a fluorinated material. In other embodiments, the nanoparticles are chemically treated with polydimethylsiloxane (PDMS). U.S. Patent Publication No. US 2006/0110542 discloses several types of modified fumed silica, and is incorporated by reference. Colloidal silicon dioxide made from fumed silica is prepared by a suitable process to reduce the particle size and modify the surface properties. The surface properties are modified to produce fumed silica by production of the silica material under conditions of a vapor-phase hydrolysis at an elevated temperature with a surface modifying silicon compound (e.g., silicon dimethylbichloride). The hydrophobic properties of the fumed silica nanoparticles are a result of treatment with at least one compound selected from the group consisting of organosilanes, fluorinated silanes, and disilazanes.

Suitable organosilanes include, but are not limited to alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, and polytriethoxysilane; trialkoxyarylsilanes; isooctyltrimethoxy-silane; N-(3-triethoxysilylpropyl) methoxyethoxyethoxy ethyl carbamate; N-(3-triethoxysilylpropyl)methoxyethoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e.g., methoxy and hydroxy substituted alkyl silanes; and combinations thereof. Suitable alkylchlorosilanes include, for example, methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials include, for example, methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane.

Suitable fluorinated silanes include fluorinated alkyl-, alkoxy-, aryl- and/or alkylaryl-silanes, and fully perfluorinated alkyl-, alkoxy-, aryl- and/or alkylaryl-silanes. An example of a suitable fluorinated alkoxy-silane is perfluorooctyltrimethoxysilane.

Suitable disilazanes include, for example, hexamethyldisilazane, divinyltetramethyldisilazane and bis(3,3-trifluoropropyl)tetramethyldisilazane. Cyclosilazanes are also suitable, and include, for example, octamethylcyclotetrasilazane.

Suitable hydrophobic fumed silica nanoparticles are commercially available from a number of sources, including Cabot Corporation (Tuscola, Ill.) under the trade name CAB-O-SIL, and Degussa, Inc. (Piscataway, N.J.), under the trade name AEROSIL. Suitable hydrophobic fumed silica particles include, for example, AEROSIL[R]R 202, AEROSIL[R]R 805, AEROSIL[R] R 812, AEROSIL[R]R 812 S, AEROSIL[R] R 972, AEROSIL[R]R 974, AEROSIL[R]R 8200, AEROXIDE [R] LE-1 and AEROXIDE [R] LE-2.

In some embodiments, the hydrophobic fumed silica nanoparticles are present in about 0.01 to about 0.5 weight percent of the composition. In other embodiments, the hydrophobic fumed silica nanoparticles are present in about 0.08 to about 0.12 weight percent of the composition. The hydrophobic fumed silica nanoparticles may also be present in about 0.03 to about 0.5 weight percent, about 0.04 to about 0.5 weight percent, about 0.03 to about 0.4 weight percent, about 0.04 to about 0.4 weight percent, about 0.04 to about 0.3 weight percent, about 0.05 to about 0.2 weight percent, about 0.05 to about 0.1 weight percent, about 0.05 to about 0.1 weight percent, about 0.06 to about 0.1 weight percent, about 0.07 to about 0.1 weight percent, about 0.05 to about 0.5 weight percent, about 0.05 to about 0.3 weight percent, or about 0.01 to about 0.09 weight percent of the composition.

In some embodiments, the composition may further include hydrophobic aerogel nanoparticles. The combination of hydrophobic fumed silica nanoparticles in conjunction with hydrophobic aerogel nanoparticles may provide a coating or film with additional water repellency. Superhydrophobic coatings that include hydrophobic aerogel nanoparticles but without fumed silica nanoparticles can provide superhydrophobic, optically clear thin films. But these films fall apart with small amounts of shear force. Thus, such coatings are easily destroyed by rubbing, and do not provide prolonged protection to the coated surface. A composition including hydrophobic fumed silica nanoparticles, however, provides a more durable superhydrophobic coating, which can be well bonded to a glass surface. Combining hydrophobic aerogel with hydrophobic fumed silica allows the aerogel to be protected from rubbing shear forces by "hiding" between well-bonded fumed silica nanoparticles (See FIG. 1). The addition of hydrophobic aerogel nanoparticles can further increase the film's superhydrophobic behavior while maintaining good durability.

Suitable hydrophobic aerogel nanoparticles are very high surface area (600-800 $m^2/g$) particles with a density between about 100 and 200 $kg/m^3$ and an average particle size of about 200 nm or less. The average aerogel nanoparticle size represents an average linear dimension of the particles (e.g., an average diameter in the case of substantially spherical particles), and it may represent an average grain or crystallite size, or, in the case of agglomerated particles, an average agglomerate size. In some embodiments, the average aerogel nanoparticle size may be less than about 100 nm, less than about 75 nm, or less than about 50 nm. However, extremely small aerogel nanoparticles (e.g., a few micrometers or less) may be difficult to disperse. In some embodiments, the average aerogel nanoparticle size is from about 10 nm to about 200 nm, from about 25 nm to about 100 nm or from about 40 nm to about 60 nm.

The hydrophobic aerogel nanoparticles may be obtained from a precursor powder that is processed to reduce the average particle size to about 200 nm or smaller. The hydrophobic aerogel nanoparticles may include nanoscale surface asperities, i.e., a nanoscale surface texture characterized by protruding or sharp features separated by recessed features and/or pores at the particle surface. Coating compositions including particles with such nanoscale surface asperities may yield coatings with higher water contact angles and thus enhanced hydrophobicity. As one of ordinary skill in the art would recognize, the scale of the surface texture is smaller than the average size of the particle; generally, surface asperities are at least about 50% smaller. For example, aerogel particles of about 100 nm in average particle size may include surface asperities of about 25 nm in average size or less, and hydrophobic particles of about 50 nm in average particle size may include surface asperities of about 25 nm in size or less.

Suitable aerogel precursor powders are commercially available from a number of sources, including Cabot Corp. (Boston, Mass.). Suitable aerogel precursor powders are sold under the Nanogel Aerogel, LUMIRA® Aerogel and ENOVA® Aerogel trade names, and include, for example ENOVA™ Aerogel IC 3110, ENOVA™ Aerogel MT 1100, ENOVA™ Aerogel MT 1200, ENOVA™ Aerogel IC 3120. These porous, nanostructured particles are available in particle sizes ranging from about 5 microns to 4 mm, but may be mechanically milled or sonicated as discussed below to obtain particles of reduced sizes (e.g., less than about 50 nm) for use in forming superhydrophobic coatings.

In another aspect, the present disclosure provides a structure including a substrate and a superhydrophobic coating on at least a portion of the substrate. When the coating is on the substrate, the resulting film is superhydrophobic, optically clear and well-bonded to the substrate. The superhydrophobic coating may have a water contact angle of at least 130 degrees. In some embodiments wherein the superhydrophobic coating has a water contact angle of at least 150 degrees. For example, the water contact angle may be at least 130 degrees, at least 135 degrees, at least 140 degrees, at least 145 degrees, at least 150 degrees, at least 155 degrees, at least 160 degrees, at least 165 degrees, at least 170 degrees or at least 175 degrees. In some embodiments, the water contact angle encompasses both advancing and receding water contact angles.

In some embodiments, the he superhydrophobic coating may have a light transmission of at least 95% for wavelengths between 300 nm and 1500 nm, or for visible wavelengths between 400 nm and 700 nm. The structure of claim 11, wherein the superhydrophobic coating has a light transmission of at least 95% for wavelengths between 400 nm and 700 nm. The substrate may also be an optically transparent material such as glass or plastic. In embodiments where the substrate is also optically transparent, the coated substrate allows light (e.g., from a laser or optical sensor) to be transmitted through the substrate and the superhydrophobic coating with limited interference. The superhydrophobic nature of the coating may also enable the substrate to stay clean and dry by limiting the ability for water (e.g., rain) and dirt or dust from accumulating on the surface.

The superhydrophobic coating may also adhere to the substrate in a manner that does not allow it to be removed by rubbing or by exposure to environmental conditions (e.g., sun, rain, wind, etc.). This aspect of the superhydrophobic coating allows a single application to remain on the substrate for a prolonged period of time, and is a characteristic not previously known for a superhydrophobic, optically transparent coating.

In some embodiments, the structure further comprises a silane layer disposed between the superhydrophobic coating and the substrate. The silane may be employed to modify the surface energy or wettability of the surface of the substrate prior to the application of the superhydrophobic composition. The silane may be a silicon containing compound having linear alkyl, branched alkyl or aryl groups, including dipodal silanes, and may be optionally fluorinated. In some embodiments, the silane is a hydrophobic silane. Suitable silanes include, for example, organoethoxysilane, trimethoxysilane, (perfluorobutyl)ethyltriethoxysilane, (3,3,3-trifluoropropyl)trimethoxysilane and any fluorinated silane described herein.

In another aspect, the present disclosure provides a method for making a composition as described herein. The method involves:

(a) combining a hydrophobic fluorinated solvent, a binder comprising a hydrophobic fluorinated polymer, fumed silica nanoparticles, and optionally, hydrophobic aerogel nanoparticles;

(b) mixing the combination; and (c) drying the mixture to provide the composition.

In embodiments where the composition includes hydrophobic aerogel nanoparticles, the combination may further include hydrophobic aerogel nanoparticles added prior to mixing. Mixing by sonication, (e.g., with a sonic probe) can be used to break up conglomerates of the hydrophobic fumed silica nanoparticles and/or the hydrophobic aerogel nanoparticles, for example, if the conglomerated nanoparticles are large enough to scatter a significant amount of light.

the hydrophobic aerogel particles, and dried to provide the desired material. Table 1 lists example compositions and the amounts of each component as weight percent of the composition.

TABLE 1

Example Compositions

| Composition No. | Fluorinated Solvent | Fluoropolymer Binder | Hydrophobic Fumed Silica Nanoparticles | Hydrophobic Aerogel Nanoparticles |
|---|---|---|---|---|
| A | Fluorinert ™ FC-40 | Hyflon ® AD (1.0%) | Aerosil ® (0.5%) | ENOVA ® Aerogel IC3100 (0.3%) |
| B | Fluorinert ™ FC-40 | Hyflon ® AD (0.6%) | Aerosil ® (0.3%) | ENOVA ® Aerogel IC3100 (0.2%) |
| C | Fluorinert ™ FC-40 | Hyflon ® AD (0.5%) | Aerosil ® (0.3%) | ENOVA ® Aerogel IC3100 (0.2%) |
| D | Fluorinert ™ FC-40 | Hyflon ® AD (0.3%) | Aerosil ® (0.15%) | ENOVA ® Aerogel IC3100 (0%) |

In another aspect, the present disclosure provides a method for coating a substrate with a composition disclosed herein. The method involves:

(a) depositing a silane on at least a portion of a substrate; and (b) depositing a composition on at least a portion of a surface of the deposited silane.

The silane may help prepare the substrate for enhanced bonding with the composition, particularly where the substrate is highly hydrophilic (e.g., glass).

Unlike other well bonded, superhydrophobic, optically transparent thin films known in the art, the sprayable composition described herein has the added advantage of being easily handled and applied. While conventional compositions are often applied with complicated, expensive, and cumbersome processes such as physical vapor deposition, the composition described herein may be applied to the substrate by, for example, spray coating, spin coating, or dip coating, or by any other deposition techniques known in the art. Typically, the composition is deposited onto a clear substrate formed of an optically transparent material, such as glass or acrylic, although other substrates may be used.

After depositing the coating formulation, the solvent may be removed by air drying or by heating the substrate and/or deposited composition at a temperature above the boiling point of the fluorinated solvent. For example, when Fluorinert™ FC-40 (b.p. of 165° C.) is used as the fluorinated solvent, the substrate may be heated to a temperature in excess of 165° C. to promote the evaporation of the fluorinated solvent.

EXAMPLES

Example 1: Formation of a Superhydrophobic Composition

An amorphous fluoropolymer binder is dissolved in a fluorinated solvent.

Hydrophobic fumed silica nanoparticles are added. Optionally, hydrophobic aerogel nanoparticles are added. The mixture is mixed with a sonic probe to break up conglomerates of the hydrophobic fumed silica particles and It should be understood that arrangements described herein are for purposes of example only. As such, those skilled in the art will appreciate that other arrangements and other elements can be used instead, and some elements may be omitted altogether according to the desired results.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

The invention claimed is:

1. A method comprising:
   forming a silane layer on a substrate, wherein forming the silane layer on the substrate comprises depositing a silane on the substrate; and
   after forming the silane layer on the substrate, depositing a composition on the silane layer, wherein the composition comprises
   a hydrophobic fluorinated solvent;
   a binder comprising a hydrophobic fluorinated polymer; and
   hydrophobic fumed silica nanoparticles.

2. The method of claim 1, wherein the composition further comprises hydrophobic aerogel nanoparticles.

3. The method of claim 2, wherein the average size of the aerogel nanoparticles is within the range of 10 nm to 200 nm.

4. The method of claim 1, wherein the average size of the silica nanoparticles is within the range of 10 nm to 200 nm.

5. The method of claim 1, wherein the substrate is optically transparent.

6. The method of claim 5, wherein the substrate is glass.

7. The method of claim 5, wherein the substrate is plastic.

8. The method of claim 1, wherein the silane includes a linear alkyl group, a branched alkyl group, or an aryl group.

9. The method of claim 1, wherein the silane is a dipodal silane.

10. The method of claim 1, wherein the silane is a hydrophobic silane.

11. The method of claim 1, wherein the silane is selected from the group consisting of organoethoxysilane, trimethoxysilane, (perfluorobutyl)ethyltriethoxysilane, and (3,3,3-trifluoropropyl)trimethoxysilane.

12. The method of claim 1, wherein the silane is a fluorinated silane.

13. The method of claim 1, wherein the binder is present in about 0.3 to about 1.5 weight percent of the composition.

14. The method of claim 1, wherein the hydrophobic fumed silica nanoparticles are present in about 0.01 to about 0.5 weight percent of the composition.

15. The method of claim 1, wherein the binder is amorphous, optically clear and soluble in the hydrophobic fluorinated solvent.

16. The method of claim 1, wherein the hydrophobic fumed silica nanoparticles are chemically treated with a fluorinated material.

17. The method of claim 1, wherein the hydrophobic fumed silica nanoparticles are chemically treated with polydimethylsiloxane (PDMS).

18. The method of claim 1, wherein depositing the composition comprises applying the composition by spray coating, spin coating, or dip coating.

19. The method of claim 1, further comprising:
    after depositing the composition, removing the fluorinated solvent.

20. The method of claim 19, wherein removing the fluorinated solvent comprises heating at least one of the substrate or the deposited composition to a temperature above the boiling point of the fluorinated solvent.

* * * * *